United States Patent
Kobayashi

(10) Patent No.: US 8,382,513 B2
(45) Date of Patent: Feb. 26, 2013

(54) CONNECTING MEMBER FOR INSTALLING PHOTOVOLTAIC CELL MODULE

(75) Inventor: Shuichi Kobayashi, Takahama (JP)

(73) Assignee: Yanegijutsukenkyujo Co., Ltd., Takahama-shi, Aichi (JP)

( * ) Notice: Subject to any disclaimer, the term of this patent is extended or adjusted under 35 U.S.C. 154(b) by 0 days.

(21) Appl. No.: 12/991,881

(22) PCT Filed: Jul. 9, 2009

(86) PCT No.: PCT/JP2009/062498
§ 371 (c)(1), (2), (4) Date: Nov. 9, 2010

(87) PCT Pub. No.: WO2010/119579
PCT Pub. Date: Oct. 21, 2010

(65) Prior Publication Data
US 2011/0070765 A1    Mar. 24, 2011

(30) Foreign Application Priority Data
Apr. 16, 2009  (JP) ................... 2009-100028

(51) Int. Cl.
*H01R 31/08* (2006.01)
(52) U.S. Cl. ....................................... 439/507
(58) Field of Classification Search .......... 439/507, 439/92; 136/251, 244
See application file for complete search history.

(56) References Cited

U.S. PATENT DOCUMENTS

| | | | | |
|---|---|---|---|---|
| 1,893,481 A | * | 1/1933 | Adams | 52/489.1 |
| 4,028,794 A | * | 6/1977 | Ritchie et al. | 29/882 |
| 4,115,655 A | * | 9/1978 | Prentice | 174/368 |
| 4,203,646 A | * | 5/1980 | Desso et al. | 439/724 |
| 4,322,572 A | * | 3/1982 | Snyder | 174/368 |
| 4,580,385 A | * | 4/1986 | Field | 52/578 |
| 4,824,391 A | * | 4/1989 | Ii | 439/329 |
| 4,993,959 A | * | 2/1991 | Randolph | 439/92 |
| 5,451,167 A | * | 9/1995 | Zielinski et al. | 439/92 |
| 5,934,818 A | * | 8/1999 | Schmitt et al. | 403/399 |
| 5,946,874 A | * | 9/1999 | Roberts | 52/464 |
| 6,019,614 A | * | 2/2000 | Baur et al. | 439/92 |
| 6,106,310 A | * | 8/2000 | Davis et al. | 439/95 |

(Continued)

FOREIGN PATENT DOCUMENTS
JP  2001-271468 A  10/2001
JP  2002-106131 A   4/2002

(Continued)

*Primary Examiner* — Edwin A. Leon
*Assistant Examiner* — Harshad Patel
(74) *Attorney, Agent, or Firm* — Tracy M. Heims; Apex Juris, pllc

(57) ABSTRACT

A connecting member 10 for connecting ends of adjacently arranged photovoltaic cell modules 4 fixed in a state in which the ends of the photovoltaic cell modules 4 each obtained by supporting an outer periphery of a photovoltaic cell panel 2 by frame bodies 3a and 3b are floating, including a plate-like upper piece 11, a plate-like lower piece 12 opposed to the upper piece 11 and a connecting piece 13 for connecting end sides on the same side of the lower piece 12 and the upper piece 11, where the connecting member 10 is capable of being fitted to the ends of the frame bodies 3a facing the same direction in the adjacent photovoltaic cell modules 4 so as to sandwich the same from a direction perpendicular thereto by the upper piece 11 and the lower piece 12.

4 Claims, 6 Drawing Sheets

U.S. PATENT DOCUMENTS

| | | | | |
|---|---|---|---|---|
| 6,111,189 A * | 8/2000 | Garvison et al. | | 136/244 |
| 6,116,951 A * | 9/2000 | Shu | | 439/574 |
| 6,254,397 B1 * | 7/2001 | Elmer | | 439/6 |
| 6,428,349 B1 * | 8/2002 | Dickson et al. | | 439/513 |
| 6,464,510 B1 * | 10/2002 | Len | | 439/65 |
| 6,672,018 B2 * | 1/2004 | Shingleton | | 52/173.3 |
| 6,962,591 B2 * | 11/2005 | Lerch | | 606/324 |
| 7,435,134 B2 * | 10/2008 | Lenox | | 439/567 |
| 7,500,867 B1 * | 3/2009 | Doglio et al. | | 439/371 |
| 7,592,537 B1 * | 9/2009 | West | | 136/251 |
| 7,686,625 B1 * | 3/2010 | Dyer et al. | | 439/92 |
| 7,780,472 B2 * | 8/2010 | Lenox | | 439/567 |
| 2001/0000274 A1 * | 4/2001 | Elmer et al. | | 52/235 |
| 2007/0131273 A1 * | 6/2007 | Kobayashi | | 136/251 |
| 2008/0194154 A1 * | 8/2008 | Minnick | | 439/842 |
| 2008/0302407 A1 * | 12/2008 | Kobayashi | | 136/251 |
| 2010/0279538 A1 * | 11/2010 | Sakata et al. | | 439/395 |

FOREIGN PATENT DOCUMENTS

| | | |
|---|---|---|
| JP | 2003-336357 A | 11/2003 |
| JP | 2006-37531 A | 2/2006 |
| JP | 2006-144266 A | 6/2006 |
| JP | 2007-165499 A | 6/2007 |

* cited by examiner

CONNECTING MEMBER FOR INSTALLING PHOTOVOLTAIC CELL MODULE

CROSS REFERENCE TO RELATED APPLICATIONS

This application claims the benefit of priority to International Patent Application No. PCT/JP2009/062498 filed Jul. 9, 2009 claiming priority upon Japanese Patent Application No. 2009-100028 filed Apr. 16, 2009, of which full contents are incorporated herein by reference.

BACKGROUND OF THE INVENTION

1. Field of the Invention

The present invention relates to a connecting member for connecting ends of predetermined members such as a photovoltaic cell module obtained by supporting an outer periphery of a photovoltaic cell panel by a frame body and a decorative cover arranged on an outer peripheral side of the photovoltaic cell module, and especially relates to the connecting member for connecting the ends of the predetermined members fixed in a state in which the ends thereof are floating.

2. Description of the Related Art

When installing the photovoltaic cell module obtained by supporting the outer periphery of the photovoltaic cell panel by the frame body on a roof, the photovoltaic cell module to be installed on the roof by attaching a mount longer than the photovoltaic cell module on the roof at an interval corresponding to an outer size of the photovoltaic cell module, then putting frame bodies of opposed sides of the photovoltaic cell module on the mount and attaching a long cover member on the mount from above the frame body is conventionally known (Patent Document 1). However, in Patent document 1, it is necessary to attach the mount on the roof at a predetermined interval in advance according to a size of the photovoltaic cell module, and so that it takes increased time and effort for installation of the photovoltaic cell module. As a result, there is a problem that the cost of installation increases highly.

Therefore, the applicant of this application suggests the photovoltaic cell module of the above-described patent application capable of being installed on the roof through a fixing member fitted to the frame body of the photovoltaic cell module from a side surface side from a direction perpendicular thereto and is slidable along the frame body (Patent Document 2). According to this, it is not necessary to attach the fixing member in advance according to the interval of the photovoltaic cell module and the photovoltaic cell modules may be sequentially installed on the roof from one end side (for example, from an eave side) and the time and effort of installation may be simplified and the cost may be reduced.

Patent Document 1: Japanese Patent Application Laid-Open No. 2006-144266

Patent Document 2: Japanese Patent Application Laid-Open No. 2007-165499

However, in Patent document 2, in order to secure aeration property and the like below the photovoltaic cell module, the photovoltaic cell module is fixed with a space between the same and a supporting member, such as a roof board, the fixing member is formed so as to be short such as from one-sixth to one-twentieth the length of one side of the photovoltaic cell module and is fixed to the one side of the photovoltaic cell module at a plurality of sites, so that the end of the photovoltaic cell module is probably in a floating state. Therefore, when a plurality of photovoltaic cell modules are installed so as to be arranged in a planar manner, depending on a state of the roof board, a roof material and the like as the supporting member to which the fixing member is attached, displacement (especially displacement in a direction perpendicular to a surface of the supporting member) occurs between the ends of the adjacent photovoltaic cell modules and appearance of a photovoltaic power generation system composed of a plurality of photovoltaic cell modules becomes problematically bad.

Also, when the above-described displacement is found after the installation of the photovoltaic cell modules (or after attachment of the fixing member to the supporting member), it is necessary to remove once the fixing member from the supporting member, put a spacer and the like below the fixing member and attach again the fixing member, so that there is a problem of increased installation cost, and since attaching strength of the fixing member might be deteriorated depending on the material of the supporting member when the fixing member once attached is fixed again on the same position, the fixing member, that is to say, the photovoltaic cell module might not be installed in an optimal state.

Therefore, in consideration of the above-described circumstances, a problem of the present invention is to provide the connecting member capable of eliminating the displacement between the ends, preventing the cost of installation from increasing and making the appearance of the installed photovoltaic cell module excellent only by being attached to the ends of the predetermined members such as the photovoltaic cell modules and the decorative covers.

SUMMARY OF THE INVENTION

In order to solve the above-described problem, the connecting member according to the present invention is a connecting member for connecting ends of adjacently arranged predetermined members, each including a photovoltaic cell module obtained by supporting an outer periphery of a photovoltaic cell panel by a frame body, and both being fixed in a state where the ends of the predetermined members are floating, the connecting member including: a plate-like upper piece; a plate-like lower piece arranged so as to be opposed to the upper piece; and a connecting piece connecting the same sided edges of the lower piece and the upper piece, the connecting member capable of being fitted to the ends of the adjacently arranged predetermined members, both edges of which are arranged in the same direction, so as to sandwich the ends by the upper piece and the lower piece in a direction perpendicular to the edges arranged in the same direction.

Herein, "the frame body of the photovoltaic cell module obtained by supporting the outer periphery of the photovoltaic cell panel by the frame body", "the decorative cover arranged on the outer peripheral side of the photovoltaic cell module", "the plate-like roof material arranged together with the photovoltaic cell module" and the like may exemplify the "predetermined member". Also, the "end" is intended to mean the outer periphery and the corner when the predetermine member is a plate-like member such as the photovoltaic cell module, and both ends in a longitudinal direction when the predetermined member is the long member such as the decorative cover.

According to the present invention, for the predetermined member such as the photovoltaic cell module and the decorative cover fixed on the roof, a wall surface and the like in a state in which the end thereof is floating, the connecting member may be fitted to the ends of the sides facing the same direction in the adjacent predetermined members so as to sandwich the sides by the upper piece and the lower piece from outside from a direction perpendicular thereto, so that the sides facing the same direction may be joined in a substantially linear manner by the upper piece, the lower piece and the connecting piece, thereby eliminating the displacement between the predetermined members and making the appearance of the photovoltaic power generation system composed of a plurality photovoltaic cell modules excellent. Also, it is possible to eliminate the displacement between the ends only by fitting the connecting member to the ends of the adjacent predetermined members from outside from the direction perpendicular thereto, so that it is not required to adjust the displacement between the ends of the predetermined members by putting the spacer and the like below the fixing member for fixing the photovoltaic cell module to the predetermined supporting member and the time and effort in installing the photovoltaic cell module may be simplified and the cost may be reduced.

Also, if the predetermined members are fixed in a state in which the ends are displaced, since the displacement may be eliminated only by fitting the connecting member to the ends, it is not required to replace the fixing member as in the conventional case and the time and effort in installing the photovoltaic cell module may be simplified and it becomes possible to prevent the attaching strength of the fixing member from being deteriorated by replacing the fixing member, so that the fixing member, that is to say, the photovoltaic cell module may be installed in the optimal state and safety may be increased.

Further, in the connecting member, since the end sides on the same side of the lower piece and the upper piece are connected by the connecting piece, the cross-sectional shape of the connecting member probably has a substantially C-shape, and it is possible to easily form (manufacture) the connecting member by bending the plate member or by extruding a predetermined material such as metal and resin, for example, and a cost of the connecting member may be reduced.

Meanwhile, it is also possible that the ends of the sides opposed to the sides facing the same direction in a plurality of photovoltaic cell modules arranged in a lattice pattern are connected by the connecting member, and according to the same, the displacement among the corners as adjacent four ends of four photovoltaic cell modules may be eliminated. Also, it is possible to connect the adjacent corners and the side opposed to the corners in the photovoltaic cell modules arranged in a zigzag pattern by the connecting member, and according to the same, the displacement among the corners and the side in the three photovoltaic cell modules may be eliminated. Also, metal such as stainless may be used and hard resin may be used as the material of the fixing member.

Also, the connecting member according to the present invention may "include a disengagement prevention portion configured to prevent release of fit by biting into the predetermined member" in addition to the above-described configuration. Herein, "a portion having a claw shape with a pointed tip end in a direction of disengagement", "a portion having a needle-shape", "a portion having a wedge-shape with a pointed tip end" and the like may exemplify the "disengagement prevention portion".

According to the present invention, the disengagement prevention portion bites into the predetermined member to prevent the disengagement of the connecting member when the connecting member is almost disengaged from the end of the predetermined member, so that it is possible to prevent the connecting member from being disengaged from the predetermined member even when the predetermined member such as the photovoltaic cell module oscillates by rain and wind, thereby improving durability and reliability of the photovoltaic power generation system composed of a plurality of photovoltaic cell modules. Meanwhile, the disengagement prevention portion may be provided on any of the upper piece and the lower piece.

Meanwhile, when the connecting member is formed of a conducting member, it is possible to electrically connect the predetermined member and the connecting member by braking a coating film on a surface of the predetermined member, insulating coating (such as oxide coating) and the like by biting of the disengagement prevention portion into the predetermined member, so that the adjacent predetermined members may be easily electrically connected through the connecting member and ground connection and the like may be easily performed.

Further, the connecting member according to the present invention may be configured such that the adjacent predetermined members can be electronically connected with each other by the connecting member" in addition to the above-described configuration. That is to say, the connecting member may be formed of a conducting material.

According to the present invention, when the ends of the adjacent predetermined members are connected by the connecting member, in addition to the above-described effect, the predetermined members may be electrically connected, the predetermined members may be easily connected to ground, and it is not required to separately prepare a clasp and the like for the ground connection, thereby reducing the cost in installing the photovoltaic cell module.

Also, the connecting member according to the present invention may be configured such that each of the predetermined members includes a concave portion opening outward at each edge thereof, the connecting member is capable of being fitted to the ends of the adjacently arranged predetermined members so as to sandwich the concave portions and bottom portions of the predetermined members by the upper piece and the lower piece, in addition to the above-described configuration.

According to the present invention, since the ends of the predetermined members are connected such that the concave portion and the bottom portion of the predetermined member are sandwiched by the upper piece and the lower piece of the connecting member, the upper piece of the connecting member does not project above the predetermined member to be exposed as compared to a mode in which the connecting member sandwiches the upper portion and the bottom portion of the predetermined member, and the upper surface of the predetermined member such as the photovoltaic cell module may be made simple and the excellent appearance may be obtained.

Further, the connecting member according to the present invention may "include a cable holding portion configured to hold an electric cable extending from the photovoltaic cell module on a position below the predetermined members" in addition to the above-described configuration. Herein, "a portion provided with a sandwiching piece for sandwiching the cable", "a portion provided with a hook for hanging the cable", "a portion provided with a locking portion for locking a binding band for holding the cable and a hole through which this is inserted" and the like may exemplify the "cable holding portion".

According to the present invention, since the electric cable of the photovoltaic cell module may be held by the connecting member, it is not necessary to separately prepare a member to hold the electric cable and the number of separately prepared members to hold the electric cable may be reduced, thereby reducing the number of components to install the photovoltaic cell module, and since it becomes possible to hold the electric cable only by fitting the connecting member to the ends in the predetermined members, the time and effort in installing the photovoltaic cell module may be simplified and the cost may be reduced as compared to a case in which the member to hold the electric cable is separately attached.

In this manner, according to the present invention, it is possible to provide the connecting member capable of eliminating the displacement between the ends, preventing the cost of the installation from increasing and obtaining the excellent appearance of the installed photovoltaic cell module only by being attached to the ends of the predetermined members such as the photovoltaic cell module and the decorative cover.

DETAILED DESCRIPTION IN THE PREFERRED EMBODIMENTS

Figure 1:
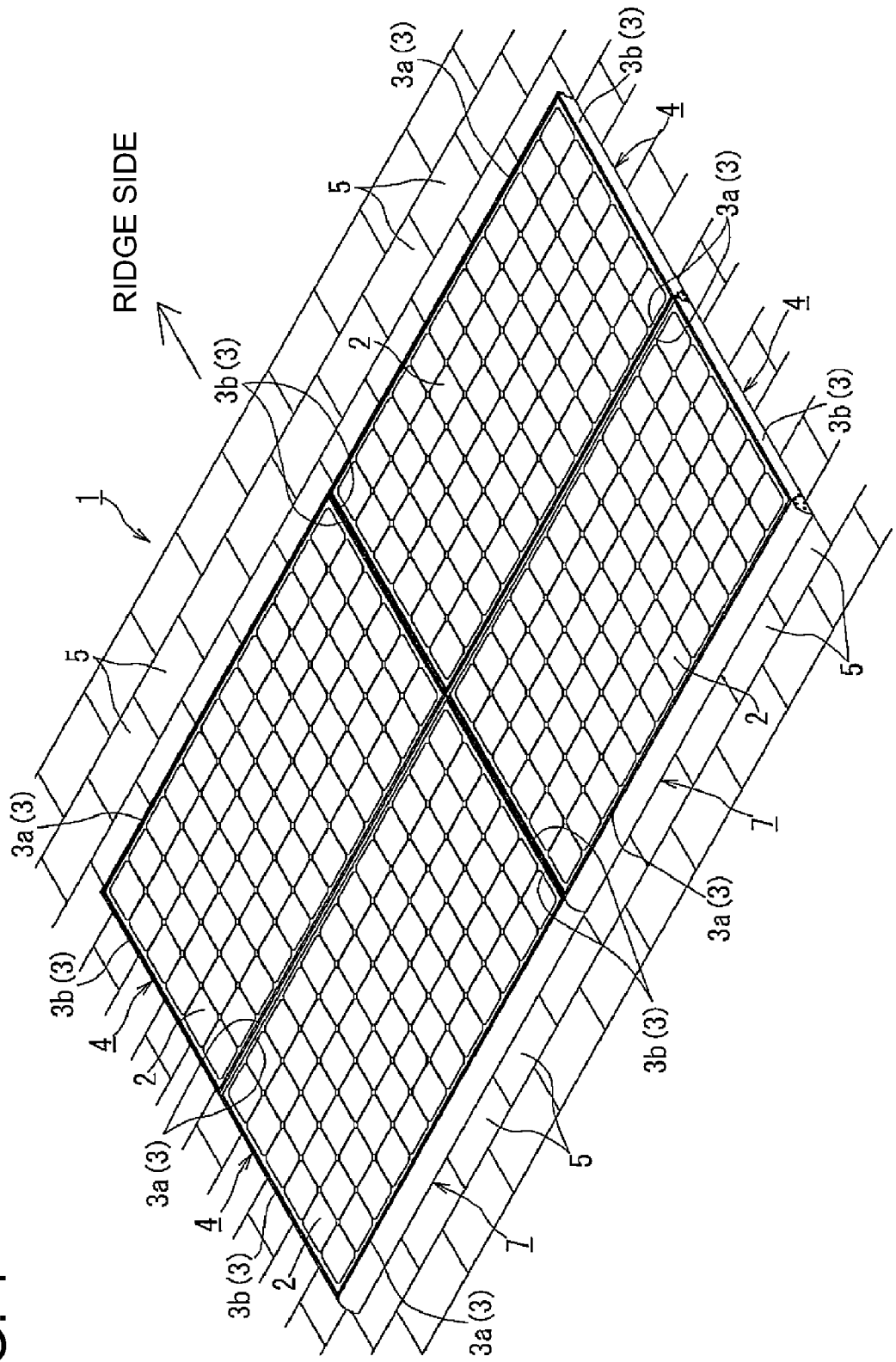
FIG. 1 is an entire perspective view of an example of a photovoltaic power generation system using a connecting member according to one embodiment of the present invention.
Figure 2:
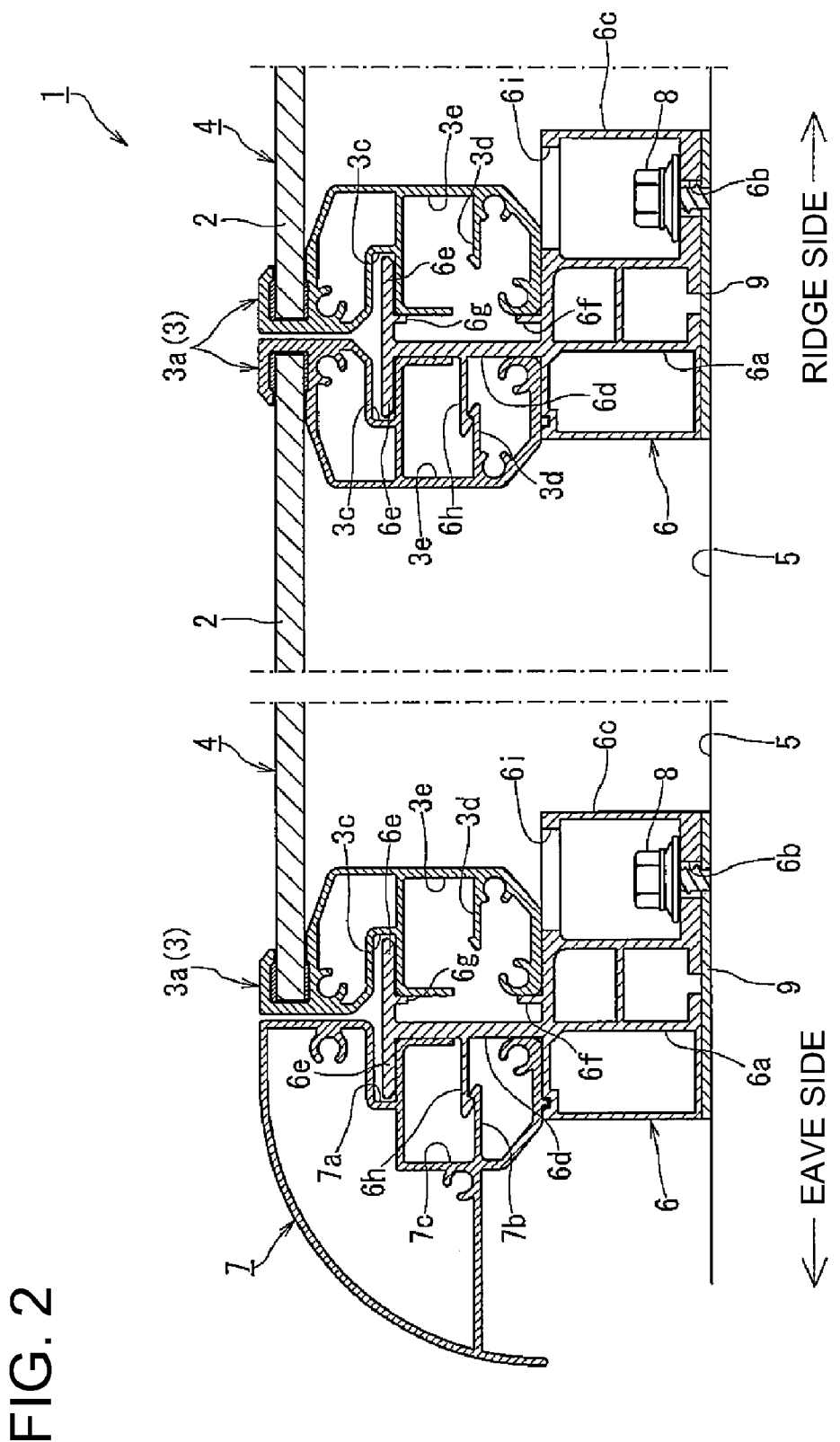
FIG. 2 is a side cross-sectional view illustrating a substantial part of the photovoltaic power generation system in FIG. 1.
Figure 3:
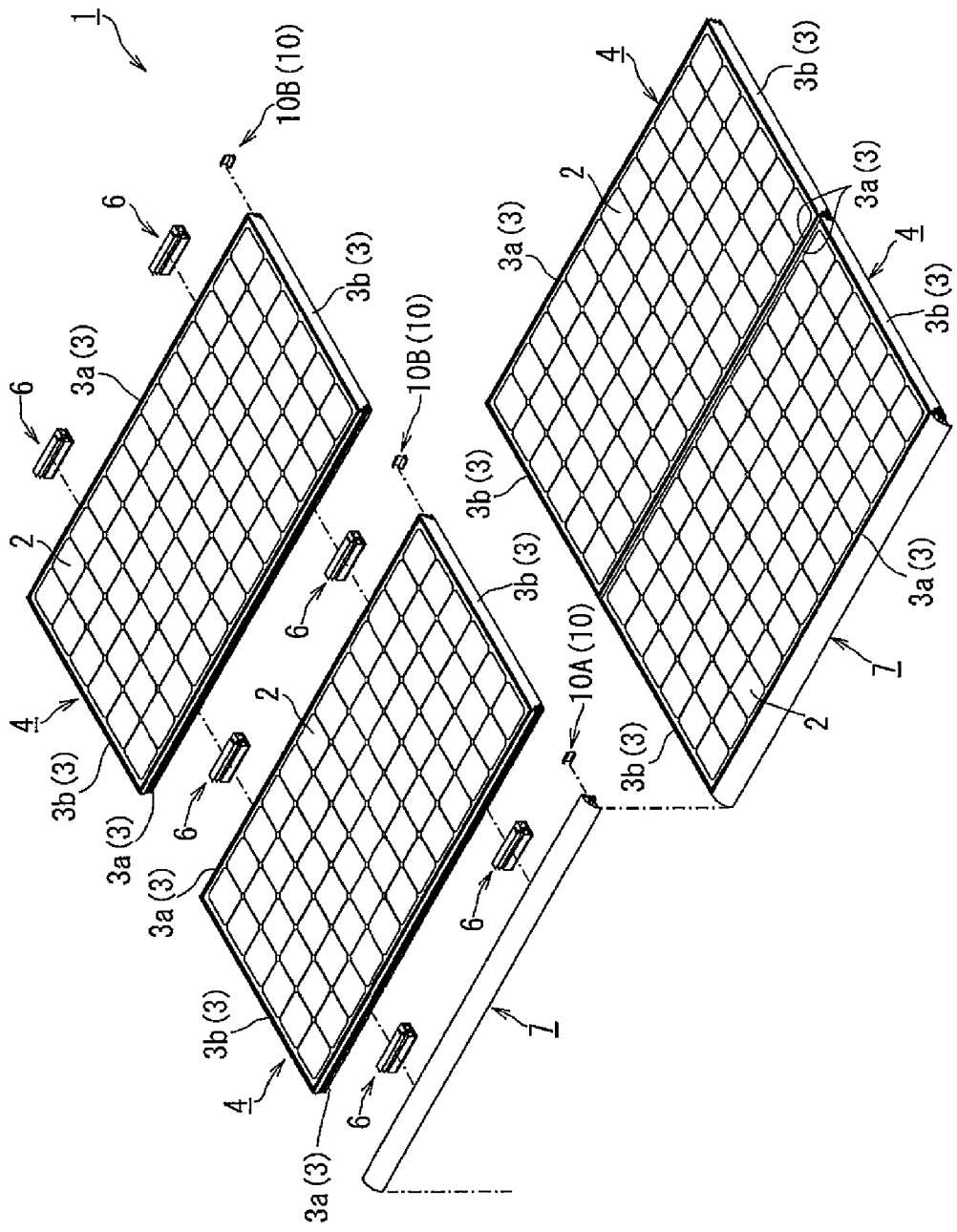
FIG. 3 is an exploded perspective view illustrating the photovoltaic power generation system in FIG. 1 by exploding the same into substantial members.
Figure 4A:
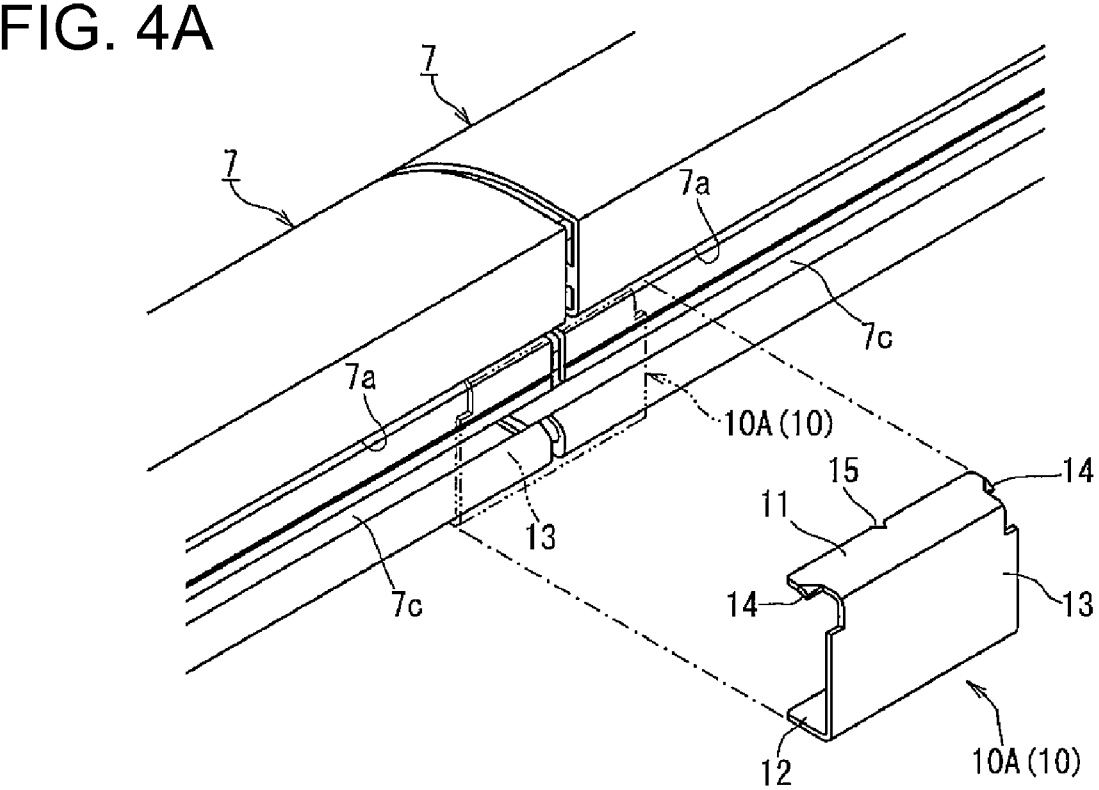
FIG. 4A is a perspective view illustrating an example in which the connecting member according to one embodiment of the present invention is used to connect ends of decorative covers in the photovoltaic power generation system in FIG. 1.
Figure 4B:
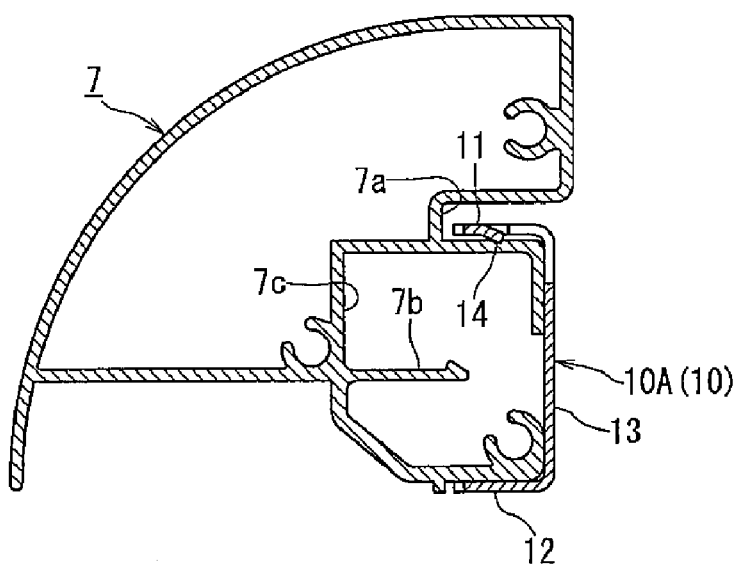
FIG. 4B is a cross-sectional view of FIG. 4A.
Figure 5A:
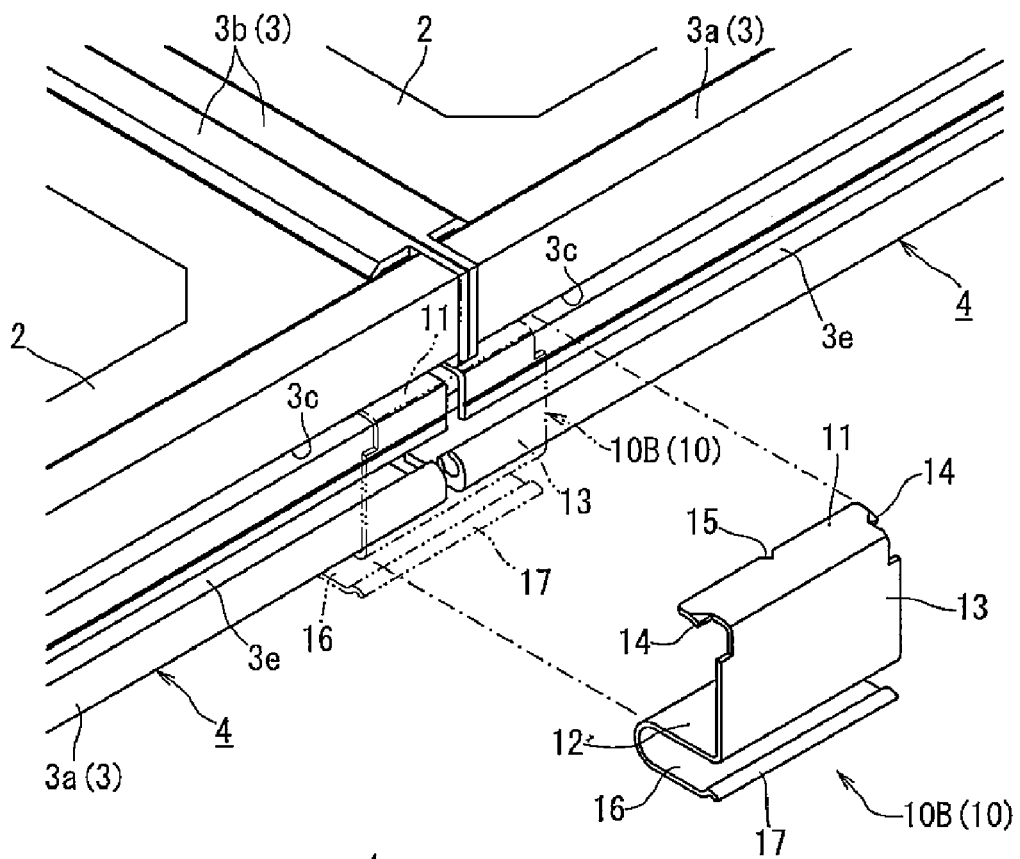
FIG. 5A is a perspective view illustrating an example in which the connecting member according to one embodiment of the present invention is used to connect ends of photovoltaic cell modules in the photovoltaic power generation system in FIG. 1.
Figure 5B:
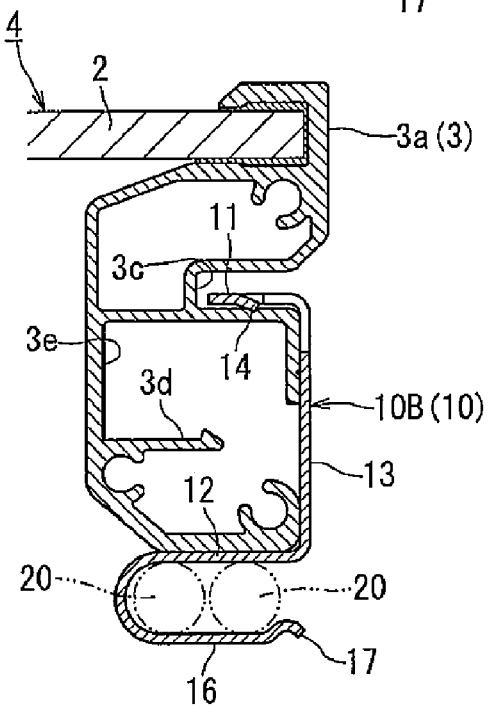
FIG. 5B is a cross-sectional view of FIG. 5A.

A connecting member for connecting ends of a plurality or photovoltaic cell modules and of decorative covers and the like in a photovoltaic power generation system installed on a roof according to one embodiment of the present invention is described in detail with reference to FIGS. 1 to 5. FIG. 1 is an entire perspective view of an example of the photovoltaic power generation system, which uses the connecting member according to one embodiment of the present invention, FIG. 2 is a side cross-sectional view illustrating a substantial part of the photovoltaic power generation system in FIG. 1, and FIG. 3 is an exploded perspective view illustrating the photovoltaic power generation system in FIG. 1 by exploding the same into substantial members. FIG. 4A is a perspective view illustrating an example in which the connecting member according to one embodiment of the present invention is used to connect the ends of the decorative covers in the photovoltaic power generation system in FIG. 1, and FIG. 4B is a cross-sectional view of FIG. 4A. FIG. 5A is a perspective view illustrating an example in which the connecting member according to one embodiment of the present invention is used to connect the ends of the photovoltaic cell modules in the photovoltaic power generation system in FIG. 1, and FIG. 5B is a cross-sectional view of FIG. 5A.

A photovoltaic power generation system 1 of this embodiment mainly includes a plurality of photovoltaic cell modules 4 each obtained by supporting an outer periphery of a photovoltaic cell panel 2 by a frame body 3, a fixing member 6 for fixing the photovoltaic cell module 4 on a roof material 5 in a state floating on an upper surface of the roof material 5 by a predetermined amount, a decorative cover 7, which covers an end face on an eave side of the photovoltaic cell module 4 arranged to be closest to an eave, and a connecting member 10 for connecting ends of adjacent photovoltaic cell modules 4 and ends of adjacent decorative covers 7.

Also, the photovoltaic power generation system 1 is provided with a plate-like waterproof member 9 formed of rubber, silicon and the like between the fixing member 6 and the roof material 5. Meanwhile, although the photovoltaic power generation system 1 composed of four photovoltaic cell modules 4 is illustrated in this example as a matter of convenience, the number of the photovoltaic cell modules 4 may be appropriately selected according to an installation site, production of electricity and the like. Although a slate is illustrated as the roof material 5 in this example, this may be another roof material such as a roof tile, a corrugated plate and a sheet of galvanized iron. Further, the fixing member 6 may be fixed to a roof board, a long rail member and the like arranged on the roof and the like in place of the roof material 5.

The frame body 3 of the photovoltaic cell module 4 is provided with frame bodies 3a arranged on a side facing an eave side and side facing a ridge side of the roof, and frame bodies 3b arranged on sides facing a transverse direction of the roof (direction perpendicular to inclination of the roof), and although not illustrated in detail, the frame bodies 3a and 3b have different cross-sectional shapes. Each of the frame bodies 3a facing the eave side and the ridge side is mainly provided with a concave portion 3c opening outward on an outer side surface thereof and an engaging concave portion 3e also opening outward and having an engaging piece 3d therein below the concave portion 3c (refer to FIG. 2). Also, the decorative cover 7 has a substantially same length as the frame bodies 3a on the eave side and the ridge side in the photovoltaic cell module 4 and of which upper surface and a side surface on the eave side are formed into a continuous circular-arc shaped curved surface. Also, the decorative cover 7 is mainly provided with a concave portion 7a opening outward and an engaging concave portion 7c also opening outward and having an engaging piece 7b therein below the concave portion 7a so as to correspond to the concave portion 3c and the engaging concave portion 3e of the frame body 3a, respectively, on a side surface on the ridge side (refer to FIG. 2).

On the other hand, the fixing member 6 for fixing the photovoltaic cell module 4 and the decorative cover 7 on the roof material 5 is mainly provided with a seat portion 6c of a predetermined height formed into a rectangular box having an H-shaped reinforcing rib 6a therein and a fixing hole 6b through which a fixing screw 8 for fixing to the roof material 5 is inserted on one of outer sides of the reinforcing rib 6a, a first upright portion 6d standing substantially vertically upward from a position opposite to the fixing hole 6b relative to a center of an upper surface of the seat portion 6c, a pair of supporting portions 6e extending substantially in parallel to the upper surface of the seat portion 6c from an upper end of the first upright portion 6d to both sides, a second upright portion 6f standing from the upper surface of the seat portion 6c by a predetermined amount on a side closer to the fixing hole 6b than the first upright portion 6d, a drooping portion 6g drooping from the supporting portion 6e by a predetermined amount on an axial line of the second upright portion 6f, and an engaged piece 6h extending from a side surface opposite to the fixing hole 6b of the first upright portion 6d between the seat portion 6c and the supporting portion 6e and is engageable with the engaging piece 3d of the frame body 3a and the engaging piece 7b of the decorative cover 7. Meanwhile, a through hole 6i through which the fixing screw 8 may pass is formed on the axial line of the fixing hole 6b on the upper surface of the seat portion 6c.

With the fixing member 6, by putting lower surfaces of the frame body 3a and the decorative cover 7 on the upper surface of the seat portion 6c, then inserting the supporting portions 6e into the concave portions 3c and 7a of the frame body 3a and the decorative cover 7, respectively, and allowing the outer side surfaces of the frame body 3a and the decorative cover 7 to abut the first upright portion 6d, the second upright portion 6f and the drooping portion 6g, downward movement is restricted by the seat portion 6c, upward movement is restricted by the supporting portions 6e, and further, outward movement in a direction perpendicular to a direction in which the frame body 3a and the decorative cover 7 extend substantially along a surface of the roof material 5 is restricted by the first upright portion 6d, the second upright portion 6f and the drooping portion 6g, so that the frame body 3a and the decorative cover 7 may be fixedly fitted. Also, by engaging the engaged piece 6h of the fixing member 6 with the engaging piece 3d of the frame body 3a and the engaging piece 7b of the decorative cover 7, the movement of the frame body 3a and the decorative cover 7 fitted on a side of the engaged piece 6h of the first upright portion 6d in a direction away from the first upright portion 6d may be restricted.

Meanwhile, as illustrated, the pair of supporting portions 6e of the fixing member 6 are formed to have lengths not to project outward from the seat portion 6c, and the supporting portion 6e on a side of the fixing hole 6b is formed to have the length not to overlap with the through hole 6i in a planar view. Also, the fixing member 6 of this example is obtained by cutting an extrusion having the identical cross-sectional shape into predetermined length pieces (for example, one-sixth to one-twentieth the length of the frame body 3a of the photovoltaic cell module 4) and forming the fixing hole 6b, the through hole 6i and the like.

The connecting member 10 in the photovoltaic power generation system 1 of this example may be separated into a first connecting member 10A used for connecting the ends of the adjacently arranged decorative covers 7 and a second connecting member 10B used for connecting the ends of the frame bodies 3a on the ridge side of the adjacently arranged photovoltaic cell modules 4. Meanwhile, in the first and second connecting members 10A and 10B, portions having the same configuration are assigned with the same reference numeral and described. Although an example in which the first connecting member 10A is used for the ends of the decorative covers 7 and the second connecting member 10B is used for the ends of the frame bodies 3a is illustrated in this example, the second connecting member 10B may be used for the ends of the decorative covers 7 and the first connecting member 10A may be used for the ends of the frame bodies 3a, and it is possible to appropriately select them according to a situation.

As illustrated in FIGS. 4 and 5, the connecting member 10 (first connecting member 10A, second connecting member 10B) of this example is provided with a plate-like upper piece 11 to be inserted into the concave portion 3c of the frame body 3 in the photovoltaic cell module 4 and the concave portion 7a of the decorative cover 7, a plate-like lower piece 12 arranged so as to be opposed to the upper piece 11 and is capable of abutting bottom portions of the frame body 3 and the decorative cover 7, and a plate-like connecting piece 13 for connecting end sides on the same side of the upper piece 11 and the lower piece 12, and is formed to have a substantially C-shaped cross section by the upper piece 11, the lower piece 12, and the connecting piece 13. Also, the connecting member 10 is provided with disengagement prevention portions 14 formed into a claw shape so as to extend on a side of the lower piece 12 as being closer to the connecting piece 13 on both ends in a longitudinal direction of the upper piece 11.

Also, the connecting member 10 is provided with a V-shaped notch 15 on a substantially center portion in the longitudinal direction of the upper piece 11 on an end side opposite to the connecting piece 13, so that a center position in a longitudinal direction of the connecting member 10 may be known by the notch 15, and by positioning to fix the ends of the frame body 3a and the decorative cover 7 according to a width of a tip end of the notch 15 set to 2 to 5 mm, contact of the frame bodies 3a and the decorative covers 7 by thermal expansion due to change in temperature and the like and occurrence of strain thereof may be prevented. Meanwhile, the connecting member 10 of this example is formed by bending a metal plate material made of stainless and the like, and the disengagement prevention portion 14 is formed into the claw shape by notching a predetermined position on a side of the end side in the longitudinal direction of the upper piece 11 and obliquely bending the end facing the connecting piece 13 side.

It is possible to elastically fit the connecting member 10 to the ends of the frame body 3a and the decorative cover 7 by inserting the upper piece 11 into the concave portions 3c and 7a and allowing the lower piece 12 to abut the bottom portions of the frame body 3a and the decorative cover such that the connecting member 10 straddles the concave portions 3c and 7a of the frame body 3a and the decorative cover 7, respectively, and the bottom portions of the concave portion 3a and the decorative cover, and it is possible to join the frame bodies 3a and the decorative covers 7 in a substantially linear manner by connecting the adjacent ends. Also, since the disengagement prevention portion 14 is oblique, the upper piece 11 may be easily inserted into the concave portions 3c and 7a; however, a lower end of the disengagement prevention portion 14 acts to bite into the bottom surfaces of the concave portion 3c and 7a in a direction of disengagement of the upper piece 11 to excellently prevent the connecting member 10 from being disengaged, and it is possible to electrically connect the adjacent photovoltaic cell modules 4 (frame bodies 3a) to connect them to ground by braking a coating film on a surface of the frame body 3a, insulating coating and the like by biting of the disengagement prevention portion 14.

As illustrated in FIG. 5, in addition to the above-described configuration, the second connecting member 10B in the connecting member 10 is further provided with a cable holding portion 16 bending downward to form a U-shape together with the lower piece 12 so as to be continuous from an end side opposite to the connecting piece 13 of the lower piece 12 and is capable of holding an electric cable 20, which may be inserted, extending from the photovoltaic cell module 4 and a warping portion 17 bending upward to form a circular-arc shape on a tip end side of the cable holding portion 16 (end side on the same side as the connecting piece 13) for preventing drop of the electric cable 20 from the cable holding portion 16 and making the electric cable 20 be easily inserted into the cable holding portion 16 to be held. The second connecting member 10B may hold the electric cable 20 below the frame body 3a in addition to the above-described function.

In the photovoltaic power generation system 1 of this example, the fixing member 6 is fixed to the roof material 5 such that the fixing hole 6b is located on the ridge side relative to the first upright portion 6d, then, to the fixing member 6 located to be closest to the eave, the decorative cover 7 is fixedly fitted on the eave side and the frame body 3a on the eave side of the solar cell module 4 is fixedly fitted on the ridge side across the first upright portion 6d and the second upright portion 6f, and, to the fixing member 6 located closer to the ridge, the frame body 3a on the ridge side of the photovoltaic cell module 4 is fixedly fitted to the eave side and the frame body 3a on the eave side of the photovoltaic cell module 4 located closer to the ridge is fixedly fitted on the eave side across the first upright portion 6d and the second upright portion 6f (refer to FIG. 2). Meanwhile, although not illustrated, to the fixing member 6 arranged to be closest to the ridge, nothing is fixedly fitted on the ridge side of the second upright portion 6f. Also, the seat portion 6c of the fixing member 6 on which the photovoltaic cell module 4 and the decorative cover 7 are fixedly put has the predetermined height and the photovoltaic cell module 4 and the decorative cover 7 are installed in a state floating on the roof material 5 on a portion other than a portion on which they are put on the upper surface of the seat portion 6c.

In this manner, according to the connecting member 10 in the photovoltaic power generation system 1 of this embodiment, by fitting to the ends of the frame bodies 3a and the decorative covers 7 facing the same direction in the adjacent photovoltaic cell modules 4 for the photovoltaic cell modules 4 and the decorative covers 7 fixed on the roof in a state in which the ends thereof are floating, it is possible to join the frame bodies 3a and the decorative covers 7 in a substantially linear manner by the upper piece 11, the lower piece 12 and the connecting piece 13, so that displacement between the photovoltaic cell modules 4 and between the decorative covers 7 may be eliminated and appearance of the photovoltaic power generation system 1 composed of a plurality of photovoltaic cell modules 4 may be made excellent.

Also, since it is possible to eliminate the displacement between the ends only by fitting the connecting member 10 to the ends of the adjacent photovoltaic cell modules 4 and of the decorative covers 7 from outside from a direction perpendicular thereto, it is not required to adjust the displacement between the ends of the frame bodies 3a and of the decorative covers 7 by putting a spacer and the like below the fixing member 6 for fixing the photovoltaic cell module 4 to the roof material 5, so that time and effort in installing the photovoltaic cell module 4 is simplified and cost may be reduced.

Further, even when the photovoltaic cell modules 4 and the decorative covers 7 are fixed in a state in which the ends thereof are displaced, since the displacement may be eliminated only by fitting the connecting member 10 to the ends, it is not required to replace the fixing member 6 as in the conventional example, the time and effort in installing the photovoltaic cell module 4 may be simplified, and it becomes possible to prevent attaching strength of the fixing member 6 from being deteriorated by replacing the fixing member 6, so that the fixing member 6, that is to say, the photovoltaic cell module 4 may be installed in an optimal state and safety thereof may be further improved.

Also, since the disengagement prevention portion 14 bites into the bottom surfaces of the concave portions 3c and 7a to prevent the connecting member 10 from being disengaged when the connecting member 10 is almost disengaged from the end of the frame body 3a and of the decorative cover 7, it is possible to prevent the connecting member 10 from being disengaged even when the photovoltaic cell module 4 and the like oscillates by wind and rain, so that durability and reliability of the photovoltaic power generation system 1 composed of a plurality of photovoltaic cell modules 4 may be improved.

Also, by connecting the ends of the frame bodies 3a facing the same direction of the adjacent photovoltaic cell modules 4 by the connecting member 10, the frame bodies 3a (photovoltaic cell modules 4) may be electrically connected, the photovoltaic cell modules 4 may be easily connected to ground, and it is not required to separately prepare a clasp and the like for ground connection and the cost of the installation of the photovoltaic cell module 4 may be reduced.

Further, since the ends are connected by sandwiching the concave portions 3c and 7a and the bottom portions of the frame body 3a and the decorative cover 7, respectively, by the connecting member 10, the upper piece 11 of the connecting member 10 does not project above the frame body 3a and the like to be exposed as compared to a mode in which the connecting member 10 sandwiches an upper portion and the bottom portion of the frame body 3a and the decorative cover 7, so that the upper surface of the photovoltaic cell module 4 and the like may be made simple and the excellent appearance may be obtained. Also, since the plate member is bent such that the connecting member 10 has a substantially C-shaped cross-sectional shape, the connecting member 10 may be formed (manufactured) easily and the cost of the connecting member 10 may be reduced.

Also, since the second connecting member 10B may hold the electric cable 20 of the photovoltaic cell module 4, it is not necessary to separately prepare a member to hold the electric cable 20, the number of separately prepared members to hold the electric cable 20 may be reduced, the number of components to install the photovoltaic cell module 4 may be reduced, and the electric cable 20 may be held only by fitting the second connecting member 10B, so that the time and effort in installing the photovoltaic cell module 4 may be simplified and the cost may be reduced as compared to a case in which the member to hold the electric cable 20 is separately attached.

Although the preferred embodiment of the present invention have been described above, the present invention is not limited to the embodiment and various modifications and changes in design may be made without departing from the scope of the present invention as described hereinafter.

Figure 6A:
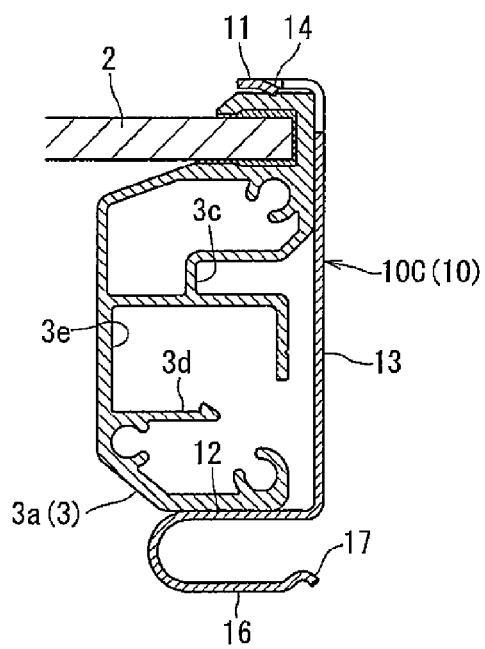
FIG. 6A is a cross-sectional view illustrating a modification of the connecting member in FIG. 5.
Figure 6B:
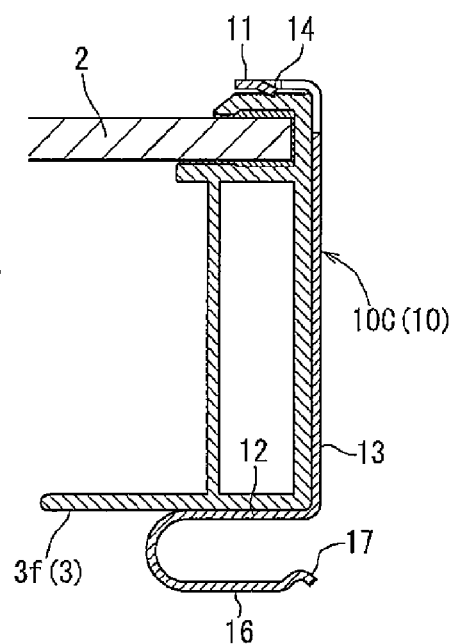
FIG. 6B is a cross-sectional view illustrating an example in which the connecting member in FIG. 5A is used in a frame body of another mode in the photovoltaic cell module.

That is to say, although it is described in the above-described embodiment that the connecting member 10 is fitted so as to straddle the concave portion 3c and the bottom portion of the frame member 3 of the photovoltaic cell module 4 or the concave portion 7a and the bottom portion of the decorative cover 7, the member is not limited to this, and a connecting member 10C to be fitted so as to straddle the upper portion and the bottom portion of the frame body 3a and the like as illustrated in FIG. 6A, for example, is also possible. In this connecting member 10C, as illustrated in FIG. 6B, the ends of frame bodies 3f without the concave portion 3c (conventional frame bodies) may be connected and an effect similar to the above may be obtained.

Figure 6C:
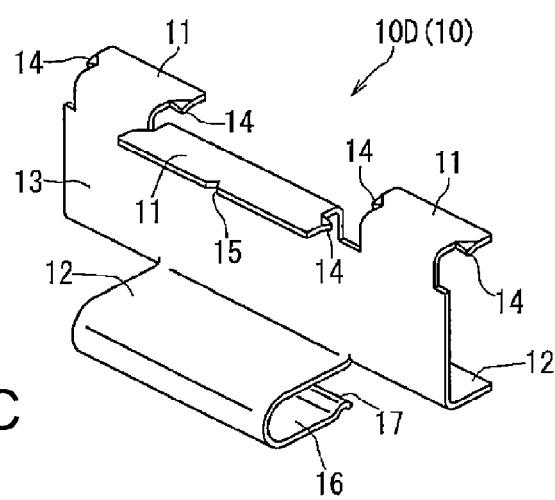
FIG. 6C is a perspective view illustrating the connecting member in yet another embodiment.

Although the connecting member 10 to connect the ends of the adjacent decorative covers 7 and the ends of the frame bodies 3a facing the same direction in the adjacent photovoltaic cell modules 4 is described in the above-described embodiment, the member is not limited to this, and a connecting member 10D provided with the upper pieces 11 and the lower pieces 12 on the both sides of the connecting piece 13, as illustrated in FIG. 6C, for example, is also possible. According to the connecting member 10D, it is possible to connect the ends of the frame bodies 3a opposed to the frame bodies 3a facing the same direction in a plurality of photovoltaic cell modules 4 arranged in a lattice pattern as illustrated in FIG. 1, and the ends of the adjacent decorative covers 7 and the ends of the frame bodies 3a on the eave side of the photovoltaic cell modules 4 adjacent to the decorative covers 7, so that the displacement among adjacent four ends (corners) of four photovoltaic cell modules 4 and the displacement among the ends of the decorative covers 7 and the photovoltaic cell modules 4 may be eliminated. Also, according to the connecting member 10D, although not illustrated, the ends (corners) of the frame bodies 3a facing the same direction in the photovoltaic cell modules 4 arranged in a zigzag pattern and an intermediated portion (side) of the frame body 3a opposed to the frame bodies 3a may be connected to one another, thereby eliminating the displacement among the corners and the side of three photovoltaic cell modules 4.

Although the connecting member 10 used in the photovoltaic power generation system 1 installed on the roof is described in the above-described embodiment, the member is not limited to this and may be used in the photovoltaic power generation system installed on a wall surface and a ground surface.

What is claimed is:

1. A connecting member for connecting a pair of photovoltaic cell modules adjacent to each other, each having a photovoltaic cell panel and a frame body supporting an outer periphery of the photovoltaic cell panel, a pair of frame bodies adjacent to each other having respective ends thereof facing each other fixed in a state where a pair of photovoltaic cell panels are substantially parallel to roof material and are floating above the roof material, the connecting member comprising:
    a plate-like upper piece;
    a plate-like lower piece substantially parallel to the plate-like upper piece;
    a connecting piece connecting the plate-like lower piece and the plate-like upper piece at identical side edges in such a manner that the plate-like upper piece, the plate-like lower piece, and the connecting piece are formed in a substantially C-shaped cross section; and
    a disengagement prevention portion formed in a claw shape such that at least one corner of the plate-like upper piece is bent obliquely downwards or at least one corner of the plate-like lower piece is bent obliquely upwards, so that the disengagement prevention portion is configured to prevent release of elastic fit between the connecting member and the ends of the frame bodies facing each other by biting into the ends of the frame bodies facing each other and sandwiched by the plate-like upper piece and the plate-like lower piece, whereby release of the elastic fit is harder than the elastic fit; wherein each of the frame bodies, having an edge and a pair of ends opposite to each other, includes a concave portion opening outward along the edge between the pair of ends, and a bottom portion extending along the edge between the pair of ends, and
    each of the frame bodies is fixed to the roof material by a fixing member including a supporting portion to be inserted into the concave portion of said each of the frame bodies, a seat portion substantially parallel to the supporting portion having an upper surface to be mounted with the bottom portion of said each of the frame bodies and a bottom surface to be fixed to the roof material, and an upright portion connecting the supporting portion and the seat portion, whereby
    the frame bodies adjacent to each other are capable of being connected at respective ends thereof facing each other by the connecting member, and also are capable of being fixed to the roof material at respective edges thereof by the fixing members.

2. The connecting member according to claim 1, wherein the connecting member is capable of being fitted to the ends of the frame bodies facing each other so as to sandwich the concave portions and bottom portions of respective ends of the frame bodies by the plate-like upper piece and the plate-like lower piece.

3. The connecting member according to claim 1, further comprising:
    a cable holding portion configured to hold, below the ends of the frame bodies facing each other, an electric cable extending from the photovoltaic cell module.

4. A connecting member for connecting a pair of photovoltaic cell modules adjacent to each other, each having a photovoltaic cell panel and a frame body supporting an outer periphery of the photovoltaic cell panel, a pair of frame bodies adjacent to each other having respective ends thereof facing each other fixed in a state where a pair of photovoltaic cell panels are substantially parallel to roof material and are floating above the roof material, the connecting member comprising:
    a plate-like upper piece;
    a plate-like lower piece substantially parallel to the plate-like upper piece;
    a connecting piece connecting the plate-like lower piece and the plate-like upper piece at identical side edges in such a manner that the plate-like upper piece, the plate-like lower piece, and the connecting piece are formed in a substantially C-shaped cross section; and
    a disengagement prevention portion formed in a claw shape such that at least one corner of the plate-like upper piece is bent obliquely downwards or at least one corner of the plate-like lower piece is bent obliquely upwards, so that the disengagement prevention portion is configured to prevent release of elastic fit between the connecting member and the ends of the frame bodies facing each other by biting into the ends of the frame bodies facing each other and sandwiched by the plate-like upper piece and the plate-like lower piece, whereby release of the elastic fit is harder than the elastic fit; and
    a V-shaped notch formed at a substantially center portion in a longitudinal direction of said upper piece on an end side opposite to said connecting piece.

* * * * *